US011693193B2

(12) United States Patent
Haase et al.

(10) Patent No.: US 11,693,193 B2
(45) Date of Patent: Jul. 4, 2023

(54) OPTICAL FERRULE HAVING COMPOUND STOPS (71) Applicant: 3M INNOVATIVE PROPERTIES COMPANY, St. Paul, MN (US)

(72) Inventors: Michael A. Haase, St. Paul, MN (US); Bing Hao, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/250,100

(22) PCT Filed: Jun. 25, 2019

(86) PCT No.: PCT/IB2019/055336
§ 371 (c)(1),
(2) Date: Nov. 25, 2020

(87) PCT Pub. No.: WO2020/003117
PCT Pub. Date: Jan. 2, 2020

(65) Prior Publication Data
US 2021/0215891 A1  Jul. 15, 2021

Related U.S. Application Data (60) Provisional application No. 62/691,871, filed on Jun. 29, 2018.

(51) Int. Cl.
*G02B 6/38* (2006.01)
*G02B 6/42* (2006.01)

(52) U.S. Cl.
CPC .......... *G02B 6/3885* (2013.01); *G02B 6/383* (2013.01); *G02B 6/3829* (2013.01);
(Continued)

(58) Field of Classification Search
CPC .... G02B 6/3885; G02B 6/3829; G02B 6/383; G02B 6/3839; G02B 6/3869; G02B 6/4214; G02B 6/3845
See application file for complete search history.

(56) References Cited

U.S. PATENT DOCUMENTS 6,115,521 A    9/2000  Tran et al.
6,386,767 B1 *  5/2002  Naghski ............... G02B 6/3873
                                              385/52
(Continued)

FOREIGN PATENT DOCUMENTS

WO   WO 2014-055226    4/2014
WO   WO 2017-065999    4/2017
(Continued)

OTHER PUBLICATIONS

International Search Report for PCT International Application No. PCT/IB2019/055336, dated Nov. 19, 2019, 3 pages.

*Primary Examiner* — Ryan A Lepisto
*Assistant Examiner* — Erin D Chiem
(74) *Attorney, Agent, or Firm* — Jonathan L. Tolstedt (57) ABSTRACT

An optical ferrule comprises first and second compound stop features respectively disposed at opposing sides of the optical ferrule. Each compound stop feature has upper and lower contact surfaces. The lower contact surface is offset below the mating surface of the optical ferrule along a thickness axis perpendicular to the mating surface. The upper contact surface is offset above the mating surface along the thickness axis. The lower contact surface is offset forward from the upper stop surface along a mating direction of the optical ferrule. A connecting surface connects the upper contact surface and the lower contact surface.

20 Claims, 6 Drawing Sheets (52) U.S. Cl.
CPC ......... *G02B 6/3839* (2013.01); *G02B 6/3843* (2013.01); *G02B 6/3845* (2013.01); *G02B 6/3869* (2013.01); *G02B 6/4214* (2013.01)

(56) References Cited

U.S. PATENT DOCUMENTS

| | | |
|---|---|---|
| 9,482,827 B2 | 11/2016 | Haase |
| 2002/0114582 A1 | 8/2002 | Otera |
| 2010/0135618 A1 | 6/2010 | Howard et al. |
| 2011/0091167 A1 | 4/2011 | Nishimura |
| 2011/0123151 A1 | 5/2011 | Zbinden et al. |
| 2011/0305417 A1 | 12/2011 | Wang et al. |
| 2012/0027346 A1 | 2/2012 | Castagna et al. |
| 2012/0063725 A1 | 3/2012 | Meadowcroft et al. |
| 2013/0136400 A1 | 5/2013 | Isenhour et al. |
| 2015/0219863 A1* | 8/2015 | Haase ............... G02B 6/3885 385/60 |
| 2015/0323747 A1 | 11/2015 | Leigh et al. |
| 2016/0202422 A1 | 7/2016 | de Jong et al. |
| 2016/0259132 A1 | 9/2016 | Ling et al. |
| 2017/0059785 A1 | 3/2017 | Smith |
| 2018/0284357 A1 | 10/2018 | Nelson et al. |
| 2018/0299630 A1 | 10/2018 | Son et al. |
| 2019/0265422 A1 | 8/2019 | Son et al. |

FOREIGN PATENT DOCUMENTS

| | | |
|---|---|---|
| WO | WO 2017-066037 | 4/2017 |
| WO | WO 2017-066135 | 4/2017 |
| WO | WO 2017-066137 | 4/2017 |
| WO | WO 2017-066138 | 4/2017 |
| WO | WO 2017-066139 | 4/2017 |
| WO | WO 2020-003245 | 1/2020 |

\* cited by examiner

OPTICAL FERRULE HAVING COMPOUND STOPS

TECHNICAL FIELD

This disclosure relates generally to optical ferrules, optical assemblies, and optical connectors that include optical ferrules.

BACKGROUND

Optical connectors can be used for optical communications in a variety of applications including telecommunications networks, local area networks, data center links, and internal links in computer devices. There is interest in extending optical communication to applications inside smaller consumer electronic appliances such as laptops and even cell phones. Expanded optical beams may be used in connectors for these systems to provide an optical connection that is less sensitive to dust and other forms of contamination and so that alignment tolerances may be relaxed. Generally, an expanded beam is a beam that is larger in diameter than the core of an associated optical waveguide (usually an optical fiber, e.g., a multi-mode fiber for a multi-mode communication system). The connector is generally considered an expanded beam connector if there is an expanded beam at a connection point. The expanded beam is typically obtained by diverging a light beam from a source or optical fiber. In many cases, the diverging beam is processed by optical elements such as a lens or mirror into an expanded beam that is approximately collimated. The expanded beam is then received by focusing of the beam via another lens or mirror.

BRIEF SUMMARY

Embodiments are directed to an optical ferrule having compound stops disposed on opposite sides of the optical ferrule. The optical ferrule comprises a first surface that has one or more substantially parallel grooves oriented for receiving one or more optical waveguides and a plurality of light redirecting members configured to be optically coupled to the optical waveguides. The optical ferrule has an opposing second surface comprising a mating surface that defines a mating plane. The mating surface includes an optically transmitting window for propagating an optical signal therethrough to an optically transmitting window of a mating optical ferrule. The first and second compound stop features respectively disposed at opposing sides of the optical ferrule. Each compound stop feature comprises upper and lower contact surfaces. The lower contact surface has an offset below the mating plane along a thickness axis perpendicular to the mating surface. The upper contact surface has an offset above the mating plane along the thickness axis. The lower contact surface has an offset forward from the upper contact surface along a mating direction of the optical ferrule. A connecting surface connects the upper contact surface and the lower contact surface.

According to some embodiments an optical ferrule comprises a first surface comprising one or more substantially parallel grooves oriented for receiving one or more optical waveguides and a plurality of light redirecting members configured to be optically coupled to the optical waveguides. An opposing second surface of the optical ferrule comprises a mating surface that defines a mating plane. The mating surface includes an optically transmitting window for propagating an optical signal therethrough to an optically transmitting window of a mating optical ferrule.

First and second compound stop features are respectively disposed at opposing sides of the optical ferrule. Each compound stop feature comprises an upper stop surface and a lower stop surface. The lower stop surface is offset from the upper stop surface along a mating axis of the optical ferrule and along a thickness axis perpendicular to the mating surface. A ramp surface connects the upper stop surface and the lower stop surface. The ramp surface is inclined at an angle with respect to the mating surface over a majority of a length of the ramp surface.

According to some aspects, each compound stop feature includes upper and lower stop surfaces, the lower stop surface offset from the upper stop surface along a mating axis of the optical ferrule and along a thickness axis perpendicular to the mating surface. A connecting surface connects the lower stop surface and the upper stop surface. A slope of the connecting surface relative to the mating axis is greater than zero over a majority of a length of the connecting surface.

In accordance with some aspects, the connecting surface has a length between the upper stop surface and the lower stop surface in a range of about 10% to about 50% of a thickness of the optical ferrule taken along the thickness axis perpendicular to the mating surface.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments described herein involve optical ferrules, optical ferrule assemblies and optical connectors that include such optical ferrules. Optical ferrules used in many applications may be optically coupled to one waveguide or arrays of multiple parallel waveguides (typically 4, 8 or 12 or more parallel waveguides). The individual waveguides are typically made of glass with a protective buffer coating, and the parallel waveguides are enclosed by a jacket. Optical ferrules are useful for connecting optical waveguides to other optical waveguides or to optoelectronic components for in-line interconnects and/or printed circuit board (PCB) connections, e.g., backplane connections.

One type of connector is an expanded beam connector, in which light is coupled between waveguides in a beam that is larger in diameter than the core of an associated optical waveguide and typically somewhat less than the waveguide-to-waveguide pitch. The waveguides may comprise optical fibers, e.g., multi-mode fibers for a multi-mode communication system. These expanded beam optical connectors can have non-contact optical coupling and can require reduced mechanical precision when compared with conventional optical connectors.

Optical ferrules may include mechanical stop features that halt relative motion between two mating optical ferrules as the mating surfaces of the optical ferrules slide together to make an optical connection during mating. Under some conditions, the stop features can make contact before the mating surfaces make contact. Static friction at the stop features can be strong enough to cause misalignment of the optical ferrules during mating. Embodiments discussed herein involve compound stop features that provide for reduced misalignment of optical ferrules during mating.

Figure 1A:
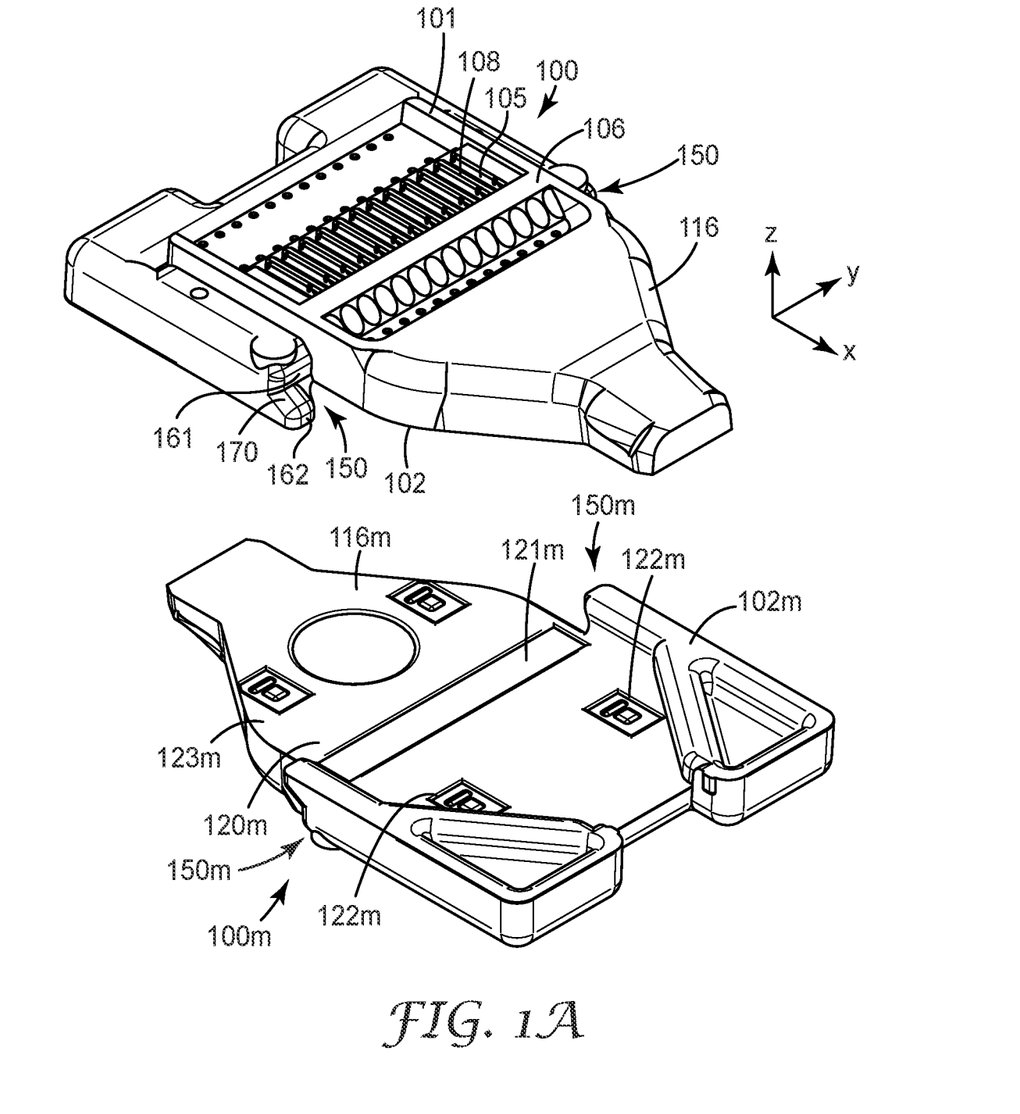
FIGS. 1A through IF show various views of an optical ferrule in accordance with some embodiments.

FIG. 1A shows an optical ferrule 100 and identical mating optical ferrule 100m prior to mating in accordance with some embodiments. The optical ferrule 100 comprises a first surface 101 that includes one or more substantially parallel grooves 105 oriented for receiving one or more optical waveguides 110 (shown in FIG. 2). The first surface 101 also includes a light redirecting member 106 configured to be optically coupled to the optical waveguides 110. The term "optical waveguide" is used herein to refer to an optical element that propagates signal light. An optical waveguide comprises at least one core with a cladding, wherein the core and cladding are configured propagate light within the core, e.g., by total internal reflection. An optical waveguide may be, for example, a single or multi-mode waveguide, a single core fiber, a multi-core optical fiber, or a polymeric waveguide. A waveguide may have any suitable cross sectional shape, e.g., circular, square, rectangular etc.

Each groove 105 is configured to receive a different optical waveguide 110 of the optical waveguides. The optical waveguides 110 received by the grooves 105 can be permanently attached, e.g., using an adhesive, to the optical ferrule 100 at the grooves 105 which provide an attachment area 108 for the optical waveguides 110.

The optical ferrule 100 is configured to mate, e.g., hermaphroditically, with another optical ferrule 100m, which may be identical to the optical ferrule 100. The optical ferrules 100, 100m illustrated in FIGS. 1A— IF include a mechanical mating tongue 116, 116m. In some embodiments, the mechanical mating tongue 116 can have a tapering width along at least a portion of a length of the tongue portion as shown in the illustrations. The mechanical mating tongue 116 can extend outwardly from a front of an optical connector housing (e.g., see FIG. 4).

Figure 2:
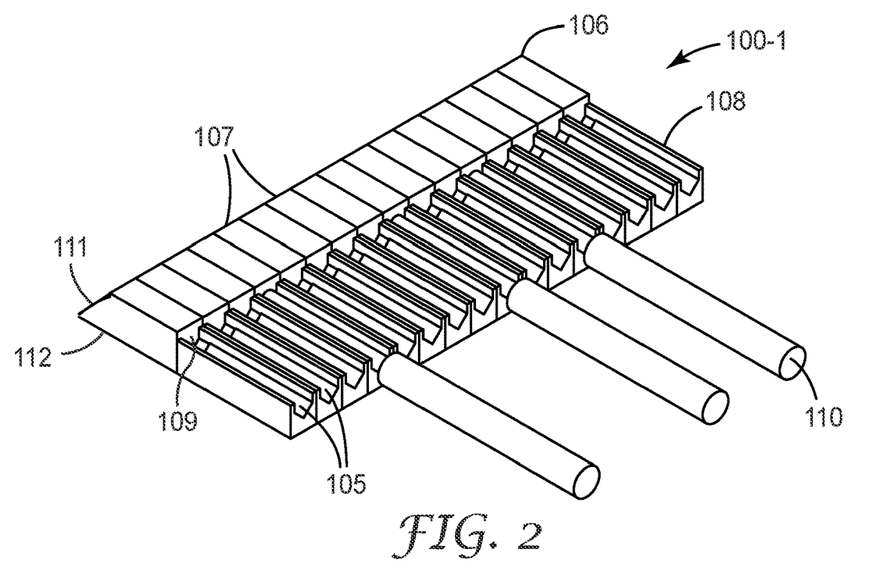
FIG. 2 is a cutaway view of a portion of optical ferrule of FIG. 1 focusing on the light redirecting member and attachment area.

FIG. 2 is a cutaway view of a portion 100-1 of optical ferrule 100 focusing on the light redirecting member 106 and attachment area 108. FIG. 2 illustrates the attachment of several optical waveguides 110 to optical ferrule 100. Optical waveguides (optical fibers) 110 are aligned in grooves 105 to which they are permanently attached. The exit end of optical waveguides 110 is situated so as to be able to direct light emanating from the optical waveguide 110 into the input side or face of light redirecting member 106. Light redirecting member 106 includes an array of light redirecting elements 107, at least one for each the optical waveguides (optical fibers) 110 attached to optical ferrule 100.

For example, in various embodiments each light redirecting element 107 comprises one or more of a prism, a lens, and a reflecting surface.

At the point of attachment, the fiber buffer coating and protective jacket (if any) of the optical waveguide may be stripped away to allow only the bare optical fiber to lie aligned and permanently affixed to groove 105. Light redirecting element 107 includes light input side 109 for receiving input light from first optical waveguide 110 disposed in and aligned by the groove 105. Light redirecting element 107 also includes light redirecting side 111 that may include a curved surface for receiving light from the input side 109 along an input direction and redirecting the received light along a different redirected direction. The light redirecting element 107 also includes output side 112 that receives light from light redirecting side 111 of light redirecting element 107 and transmits the received light as output light along an output direction toward a light redirecting member of a mating light coupling unit.

Although FIGS. 1A and 2 show an optical ferrule 100 that includes multiple light redirecting elements 107 that can be optically coupled to multiple optical waveguides 110, it is also possible that an optical ferrule includes just one light redirecting element that can be optically coupled to a single optical waveguide.

Figure 1B:
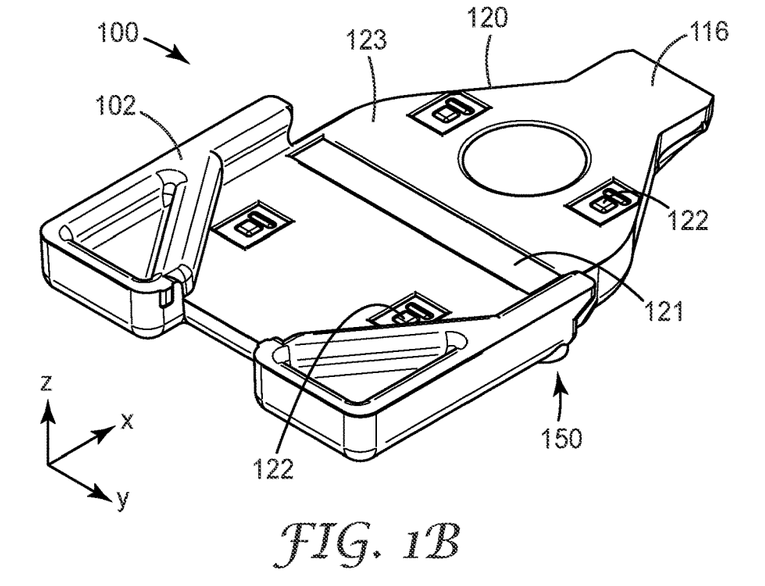

As illustrated in FIGS. 1A and 1B, the optical ferrule 100 has an opposing second surface 102 that includes a mating surface 120. The second surface 102 of the optical ferrule 100 is best seen in FIG. 1B. The mating surface 120 includes an optically transmitting window 121 for propagating an optical signal therethrough to an optically transmitting window 120m of a mating optical ferrule 100m. In some embodiments, the mating surface 120 of the optical ferrule 110 may comprise a main portion 123 that is substantially parallel to a mating plane 199 of the optical ferrule 100 (see FIG. 1F). The mating plane is parallel to the mating axis of the ferrule, and when the ferrule is perfectly aligned in the mated configuration with a mating ferrule, the mating planes of the two ferrules are coincident. There is an axis of rotation shared by two mated ferrules. That axis lies in the mating plane near the window 121. The mating surface 120 may further comprise one or more pads 122 that extend away from the main portion 123 along the thickness axis (z-axis). For example, in some configurations, the pads 122 may extend below a main portion 123 of the mating surface 120 by about 5 μm to about 10 μm. The second surface 102m of the mating optical ferrule 100m also includes a mating surface 120m comprising a main portion 123m, an optical transmitting window 121m, and pads 122m as shown in FIG. 1A.

In some embodiments, the mating surface may not include pads. When present, the one or more pads 122 may collectively occupy less than a majority, e.g., less than 50%, less than 25%, or less than 10% of the surface area of the mating surface 120. Alternatively, the pads 122 may individually or collectively occupy a substantial portion of the surface area of the mating surface, e.g., more than 10%, more than 25%, or even more than 50% of the surface area of the mating surface 120.

In some embodiments, after mating, the pads 122 of the optical ferrule 100 rest on corresponding pads 122m of the mating optical ferrule 100m, providing a small gap between the main portions 123, 123m of the mating surfaces 120, 120m of the optical ferrule 100 and the mating optical ferrule 100m. The small gap accommodates dust and/or other irregularities may be present between the main portions 123, 123m of the mating surfaces 120, 120m.

In other embodiments, after mating, the pads 122 of the optical ferrule 100 rest on the main portion of the mating surface of the mating optical ferrule 100m, providing a small gap between the main portions 123, 123m of the mating surfaces 120, 120m of the optical ferrule 100 and the mating optical ferrule 100m.

In some embodiments, when the mating surfaces 120, 120m of the optical ferrules 100, 100m do not include pads, the main portions 123, 123m of the mating surfaces 120, 120m may be in contact after the optical ferrules are mated.

In some embodiments, interaction of the compound stop features 150, 150m of the optical ferrule 100 and the mating optical ferrule 100m may provide for a small gap between the main portions 123, 123m and/or the pads 122, 122m of the mating surfaces 120, 120m.

Additional information regarding features and operation of light coupling units, optical cable subassemblies and optical connectors is discussed in commonly owned U.S. Pat. No. 9,482,827 which is incorporated herein by reference in its entirety.

Figure 4:
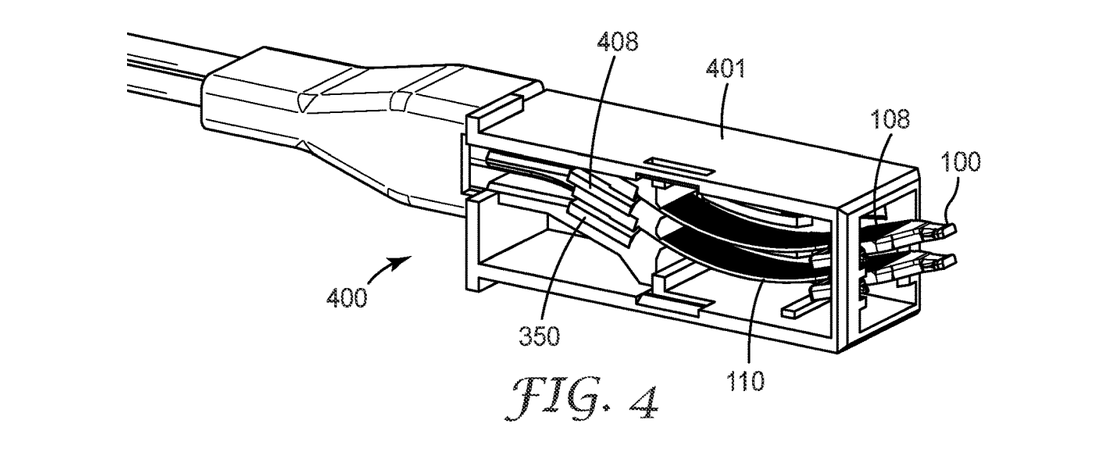
FIG. 4, depicts a portion of an optical connector that can include one or more optical ferrules according to some embodiments.

As shown in FIG. 4, an optical connector 400 can include one or more optical ferrules, such as optical ferrule 100, having optical waveguides 110 attached thereto and disposed within a housing 401. The optical waveguides 110 are attached to the attachment area 108 of the optical ferrule 100 and to a second attachment area 408 within the housing 401.

Figure 3:
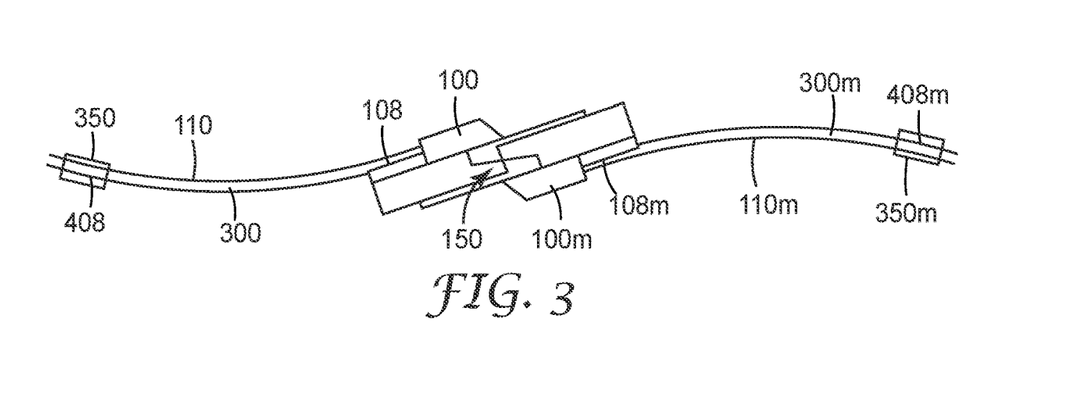
FIG. 3 illustrates a bend that develops in the optical waveguides between the first and second attachment areas that provides a predetermined mating spring force at a predetermined angle and location of an optical ferrule.

As illustrated by the diagram of FIG. 3, the length of the optical waveguides 110 between the attachment area 108 of the optical ferrule 100, 100m, and the second attachment area 408 is configured to allow a bend 300, 300m to develop in the optical waveguides 110, 110m that provides a predetermined mating spring force at a predetermined angle and location of the optical ferrule 100, 100m. In some embodiments, the second attachment area 408 may comprise a cable retainer 350, 350m attached to the waveguides 110, 110m wherein the cable retainer 350, 350m is configured to be received and secured by a retainer mount within the optical connector housing 400. Additional information regarding optical cable assemblies and housings that include cable retainers and mounts is described in commonly owned U.S. Patent Application Ser. 62/240,008 filed Oct. 12, 2015 having the title "Optical Assembly with Cable Retainer," identified by Attorney Docket Number 76662US002 which is incorporated herein by reference.

Figure 1C:
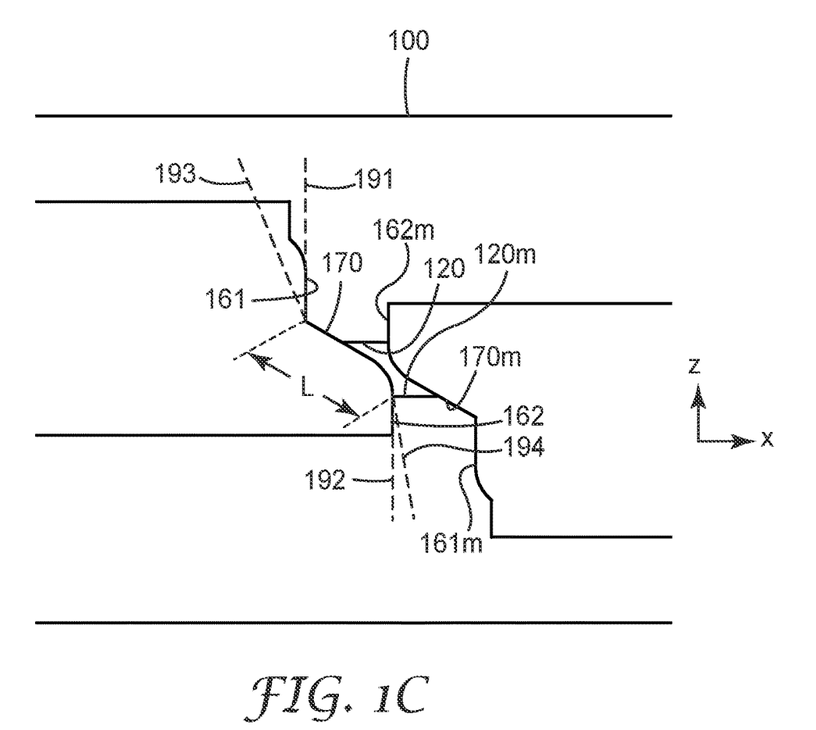
Figure 1D:
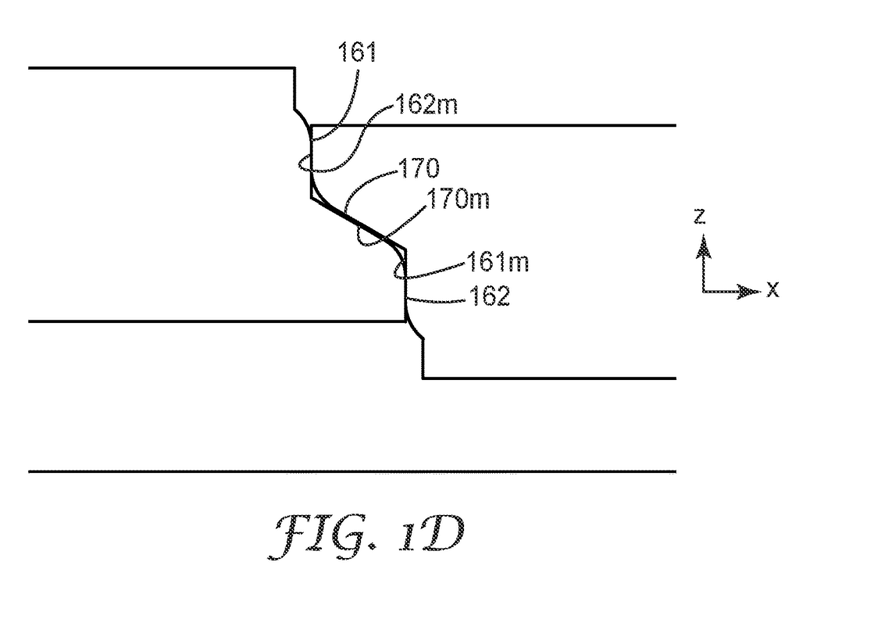
Figure 1E:
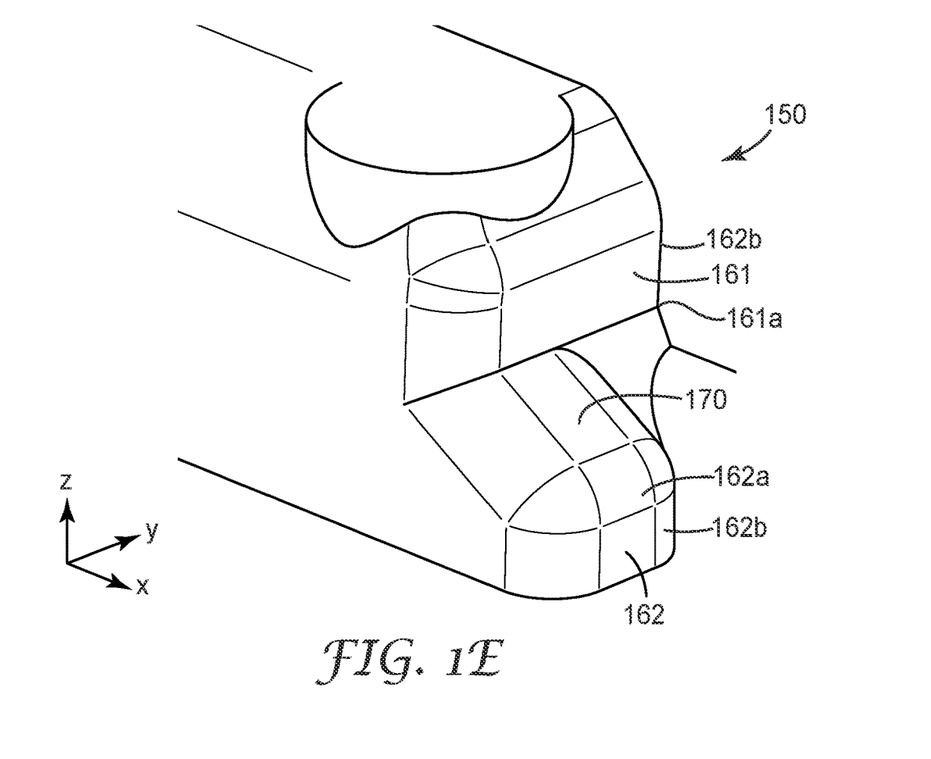
Figure 1F:
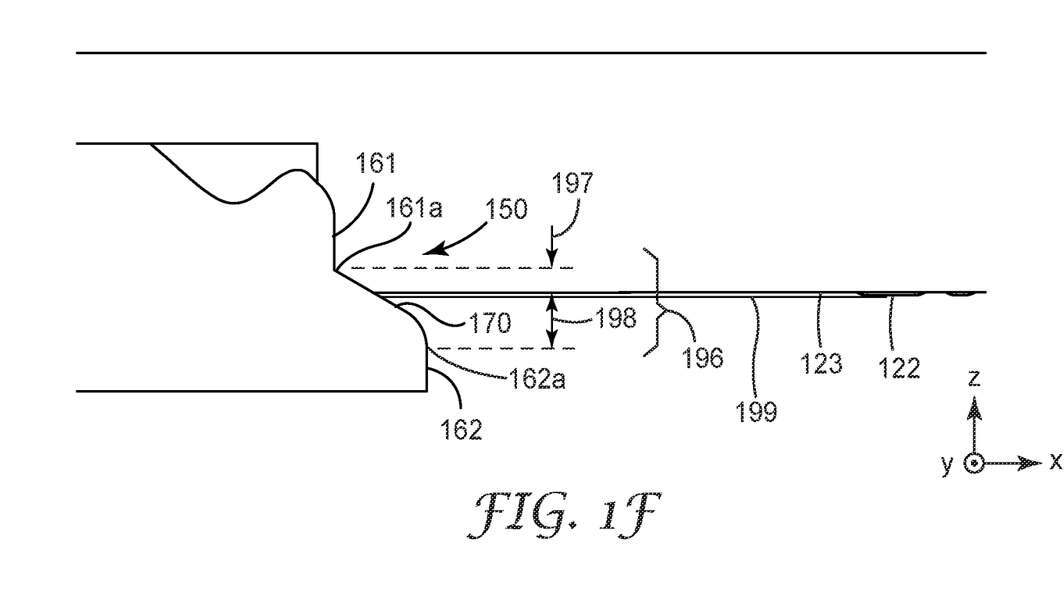

Referring again to FIGS. 1A through 1F, the optical ferrule 100, 100m includes first and second compound stops 150, 150m respectively disposed at opposite lateral sides of the optical ferrule 100, 100m. FIG. 1C shows a side view of the compound forward stops 150, 150m as the optical ferrule 100 is mating with the mating optical ferrule 100m. FIG. 1D shows a side view of the compound forward stops 150, 150m after the optical ferrule 100 is in the mated position with respect to the mating optical ferrule 100m. FIG. 1E shows a perspective view of a compound stop 150. FIG. 1F shows another side view of the compound stop 150.

Each compound stop 150, 150m has an upper stop surface 161, 161m, a lower stop surface 162, 162m and a connecting surface 170, 170m. The main portion 123 of the mating surface 120, or the lower surface of the pads 122, if pads are present, define a mating plane 199 for the optical ferrule 100 as indicated in FIG. 1F. As best seen in FIG. 1F, there is an offset 196 along the z axis (perpendicular to the mating plane 199) between the upper contact surface 161 and the lower contact surface 162. In the orientation of the ferrule shown in FIG. 1F, the offset 196 comprises an upper offset 197 above the mating plane 199 and a lower offset 198 below the mating plane. The upper offset 197 is between the bottom edge 161a of the upper contact surface 161 and the mating plane 199. The lower offset 198 is between mating plane 199 and the top edge 162a of the lower contact surface 162.

In some embodiments the offset 197 between the mating plane 199 and the bottom edge 161a of the upper contact surface 161 may be more than about 50 μm along the thickness axis (z-axis). The offset 198 between the mating plane 199 and the upper edge 162a of the lower contact surface 162 may be more than about 50 μm along the thickness axis. The lower contact surface 162 can be offset forward from the upper contact surface along the mating direction (x-axis) of the optical ferrule 100. The compound forward stop 150 includes a connecting surface 170 that connects the upper and lower contact surfaces 161, 162, e.g., the connecting surface 170 connects the lower edge 161a of the upper contact surface 161 to the upper edge 162a of the lower contact surface 162.

Notably, the terms "upper," "lower," "above," "below," "bottom," "top," and the like are used herein to identify different features and/or relative orientations between the features. The use of these terms is not intended to indicate specific positions of the features because the optical ferrules may be oriented in various positions.

As illustrated in FIGS. 1C and 1D, as the optical ferrule 100 mates with the mating optical ferrule 100m, the mating surface 120 of the optical ferrule 100 slidably engages with the mating surface 120m of the mating optical ferrule 100m and the connecting surface 170 of the optical ferrule 100 slidably engages with the connecting surface 170m on the mating optical ferrule 100m. After the optical ferrules 100, 100m are mated, as show in FIG. 1D, the upper 161 and lower 162 contact surfaces of the optical ferrule 100 contact the lower 162m and upper 161m contact surfaces of the mating optical ferrule 100m, restricting further relative motion between the optical ferrules 100, 100m along the mating axis (x-axis). Referring again to FIG. 3, the bend 300, 300m in the optical waveguides 110, 110m provides a spring force that holds the stop surfaces 161, 162 of the optical ferrule 100 in contact with the corresponding stop surfaces 162m, 161m of the mating optical ferrule 100m.

The connecting surfaces 170, 170m of the optical ferrules 100, 100m are configured to limit a separation between the mating surface 120 of the optical ferrule 100 and the mating surface 120m of the mating optical ferrule 100m after mating. When pads 122, 122m are present in the mating surface 120, 120m the connecting surfaces 170, 170m may limit the separation between the pads 122 of the optical ferrule 100 and the corresponding pads 122m of the mating optical ferrule 100m. For example, the connecting surfaces 170, 170m may limit the separation between the pads 122, 122m of the optical ferrule 100 and the mating optical ferrule 100m to less than about 4 μm.

According to some embodiments in which pads configured to contact the main portion 123m of the mating surfaces 120m of the mating optical ferrule 100m, the connecting surfaces 170, 170m may be configured to limit the separation between the pads and the main portions 123m of the mating surface 120m of the optical ferrule 100m to less than about 4 μm.

According to some embodiments in which pads are not present in either of the mating surfaces 120, 120m of the optical ferrule 100 and the mating optical ferrule 100m, the connecting surfaces 170, 170m may be configured to limit the separation between the main portions 123, 123m of the mating surfaces 120, 120m of the optical ferrule 100 and the mating optical ferrule 100m to less than about 4 μm.

In some embodiments, as shown in FIGS. 1A through IF, the connecting surface 170 is a ramp surface that is inclined at a constant angle with respect to the mating surface over a majority of a length, L, of the connecting surface 170. The angle at which the ramp surface 170 is inclined is sufficiently small to allow the ramp surface 170 to slidably engage with a ramp surface 170m of the mating optical ferrule 100m during mating. For example, the angle can be between about 15 degrees and about 65 degrees, or between about 25 degrees and about 55 degrees or may be about 30 degrees or about 45 degrees. In some embodiments, the ramp surface 170 may have a length, L, that is greater than the offset 196 (as measured along the thickness axis (z-axis)) between the upper and lower contact surfaces 161, 162.

After the optical ferrule 100 is mated with the mating optical ferrule 100m, the stop surfaces 161, 162 of the optical ferrule 100 make contact with corresponding stop surfaces 162m, 161m of the mating optical ferrule 100m as shown in FIG. 1D. Connecting surfaces 170 of the optical ferrule may be configured to make contact with corresponding connecting surfaces 170m of the mating optical ferrule 100m after mating. Alternatively, the connecting surfaces 170, 170m of the optical ferrule 100 and the mating optical ferrule 100m may be configured to be spaced apart after mating, e.g., by a distance of less than about 5 μm, or less than about 2 μm.

One or both of the first and second stop surfaces 161, 162 can be oriented substantially perpendicular to the mating plane 199 and parallel to the thickness axis (z-axis) as indicated by dashed lines 191, 192 in FIG. 1C. In some embodiments, one or both of the first and second stop surfaces 161, 162 can be disposed at a non-perpendicular angle with respect to mating plane 199 as indicated by dashed lines 193 and 194. The angle that the upper and/or lower surfaces 161, 162 make with respect to the mating plane 199 is steep enough not to allow sliding which would result in overshooting the mating position of the optical ferrules. In general, the angle that the upper and/or lower surfaces 161, 162 make with respect to the mating plane 199 is greater than the angle that the ramp connecting portion 170 makes with respect to the mating plane 199. For example, at least one of the upper stop surface and the lower stop surface can be disposed at an angle greater than about 80° with respect to the mating plane 199.

According to various embodiments, the length, L, of the connecting portion 170 (measured between the bottom edge 161a of the upper contact surface 161 and the top edge 162a of the lower contact surface 162) can be greater than about 10% of a thickness of the optical ferrule 100 (as measured along the thickness axis (z-axis) and/or can be greater than about 20% of a length of the optical ferrule 100 (as measured along the mating axis (x-axis)).

The thickness and modulus of elasticity of the optical ferrule 100 can be selected to allow the optical ferrule to flex during mating. Some amount of flexing during mating may facilitate proper seating and/or optical alignment of the optical ferrule 100 and the mating optical ferrule 100m. For example, the optical ferrule 100 may have a flexural modulus in a range of about 2000 to about 4000 MPa. The optical ferrule 100 may have a thickness as measured along the thickness axis (z-axis) in a range of about 500 to about 2000 μm. After mating, the mating surface 120 of the optical ferrule 100 can be substantially parallel with the mating surface 120m of the mating optical ferrule 100m. In some embodiments, the mating surface 120 of the optical ferrule 100 may be disposed at an angle of less than about 2 milliradians with respect to the mating surface 120m of the mating optical ferrule 100m after mating.

Figure 5A:
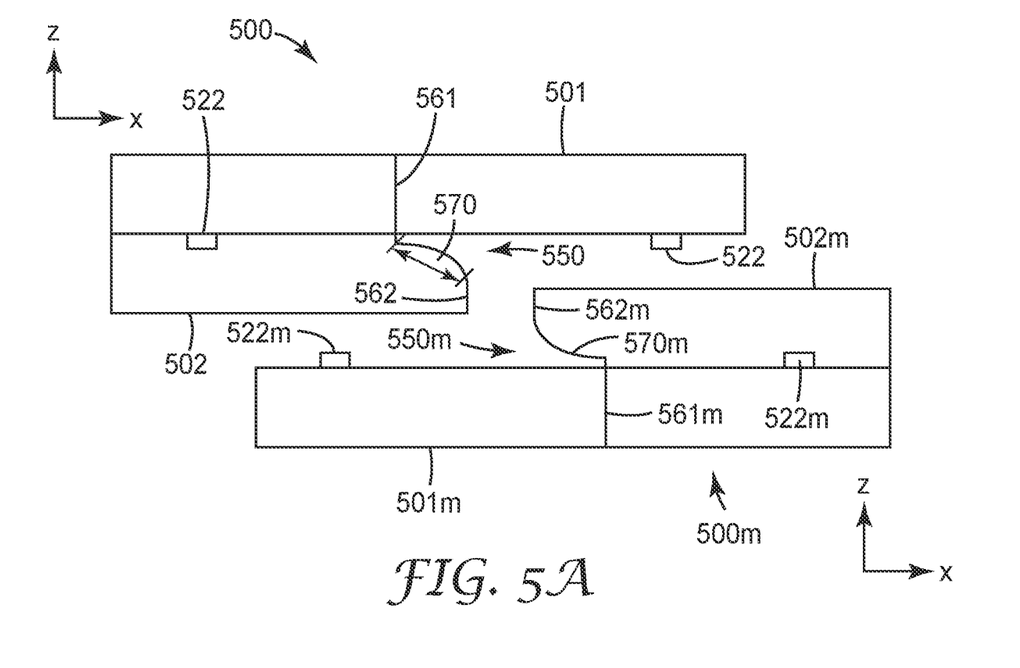
FIGS. 5A and 5B are simplified diagrams that respectively show an optical ferrule and a mating optical ferrule prior to and after mating in accordance with some embodiments.
Figure 5B:
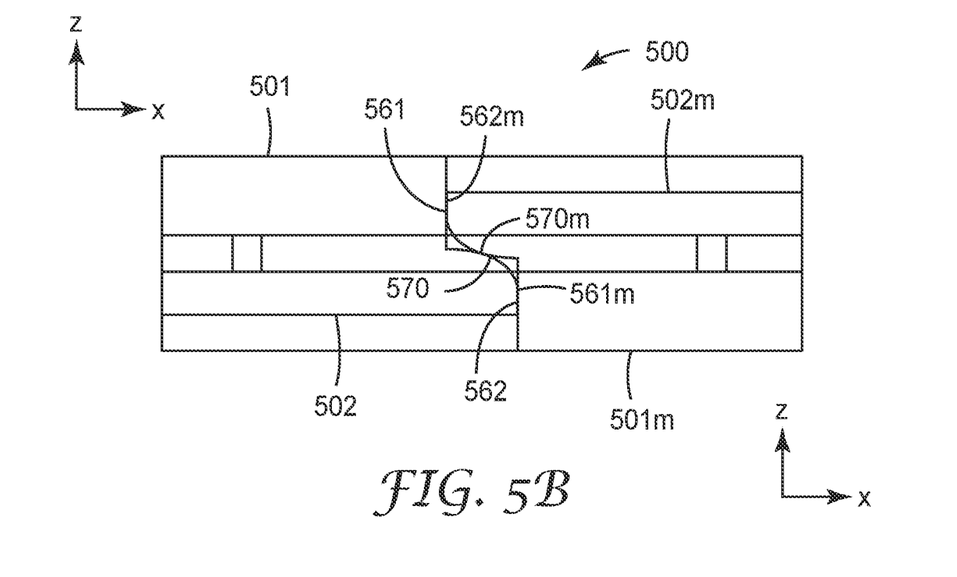

FIGS. 5A and 5B provide simplified side views optical ferrules 500, 500m having compound stops 550, 550m in accordance with some embodiments. FIGS. 5A and 5B respectively show an optical ferrule 500 and a mating optical ferrule 500m prior to and after mating. The features of the first 501, 501m and second 502, 502m surfaces of optical ferrules 500, 500m are the same as those previously described in conjunction with FIGS. 1A through 1D and are not repeated in detail in the simplified drawings of FIGS. 5A and 5B. As previously discussed, the optical ferrule 500, 500m includes a first surface 501, 501m having one or more substantially parallel grooves oriented for receiving one or more optical waveguides and a light redirecting member configured to be optically coupled to the optical waveguides. The opposing second surface 502 of the optical ferrule 500 comprises a mating surface that includes an optically transmitting window for propagating an optical signal therethrough to an optically transmitting window of a mating optical ferrule 500m. As indicated in FIGS. 5A and 5B, the second surface 502, 502m may comprise pads 522, 522m.

The optical ferrules 500, 500m include first and second compound stop features 550, 550m respectively disposed at opposing sides of the optical ferrule 500, 500m. Each compound stop feature 550, 550m comprises an upper stop surface 561, 561m and a lower stop surface 562, 562m. The lower stop surface 562, 562m is offset from the upper stop surface 561, 561m along a mating axis (x-axis) of the optical ferrule 500, 500m. The lower stop surface 562, 562m is also offset from the upper stop surface 561, 561m along the thickness axis (z-axis) perpendicular to the mating surface.

For example, the upper stop surface 561, 561m may be offset from the lower stop surface 562, 562m along the mating axis (x-axis) by about 50 μm to about 500 μm. The upper stop surface 561, 561m may be offset from the lower stop surface 562, 562m along the thickness axis (z-axis) perpendicular to the mating surface by about 100 μm to about 400 μm, e.g., 200 μm to about 400 μm.

The connecting surface 570, 570m connects the lower stop surface 562, 562m and the upper stop surface 561, 561m. The connecting surface 570 may have a length, L, between the upper stop surface 561 and the lower stop surface 562 in a range of about 10% to about 50% of a thickness of the optical ferrule 500 taken along the thickness axis (z-axis) perpendicular to the mating surface.

The connecting surface 570, 570m may have any suitable shape, e.g., may be linear, piece-wise linear, or may be curved as shown in FIGS. 5A and 5B. The slope (tangent) of the connecting surface 570, 570m measured relative to the mating axis (x-axis) is greater than zero over a majority of a length, L, of the connecting surface 570, 570m. The slope of the connecting surface 570, 570m is shallow enough to allow sliding.

After mating, the connecting surfaces 570, 570m may not be in contact after mating along all of the length, L. In some embodiments, only a portion of the connecting surfaces 570, 570m may be in contact, e.g., in a central portion of the connecting surfaces 570, 570m as illustrated in FIG. 5B. As previously discussed, but not shown here, in some embodiments, the connecting surfaces may be spaced apart from each other over the length, L. The pads 522 of the optical ferrule 500 may contact the pads 522m of the mating optical ferrule 500m as shown, or the pads 522 may be spaced apart from pads 522m by a small distance, e.g., about 4 μm, after mating. If no pads are present in the second surface 502, 502m, then the mating surfaces may be in contact or may be spaced apart as previously discussed. After mating, the mating surface of the optical ferrule 500 may be substantially parallel or disposed at a small angle, e.g., about 2 milliradians with respect to the mating surface of the mating optical ferrule 500*m*. It is preferable to mold both contact surface of the stops in the same side of the mold as the grooves and the light redirecting elements.

A discussion of molds for optical ferrules which is applicable to the present disclosure is provided in commonly owned U.S. Patent Application 62/239,996, filed Oct. 12, 2015 having the title "Optical Ferrules and Optical Ferrule Molds," which is incorporated herein by reference.

Additional information regarding optical ferrules, optical assemblies, and optical connectors that may be used in conjunction with the approaches described herein is provided in the following commonly owned U.S. Patent Applications which are incorporated herein by reference: U.S. Patent Application Ser. 62/240,000, filed Oct. 12, 2015; U.S. Patent Application Ser. 62/240,069, filed Oct. 12, 2015; U.S. Patent Application Ser. 62/240,066, filed Oct. 12, 2015; and U.S. Patent Application Ser. 62/240,008, filed Oct. 12, 2015.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. An optical ferrule, comprising:
a first surface comprising:
one or more substantially parallel grooves oriented for receiving one or more optical waveguides, and;
a plurality of light redirecting members configured to be optically coupled to the optical waveguides;
an opposing second surface comprising a mating surface that defines a mating plane, the mating surface comprising an optically transmitting window for propagating an optical signal therethrough to an optically transmitting window of a mating optical ferrule; and
first and second compound stop features respectively disposed at opposing sides of the optical ferrule, each compound stop feature comprising upper and lower contact surfaces, the lower contact surface having an offset below the mating plane along a thickness axis perpendicular to the mating surface, the upper contact surface having an offset above the mating plane along the thickness axis, and the lower contact surface having an offset forward from the upper contact surface along a mating direction of the optical ferrule; and
a connecting surface connecting the upper contact surface and the lower contact surface.

2. The optical ferrule of claim 1, wherein:
the mating surface is configured to slidably engage with a mating surface of a mating optical ferrule; and
the upper and lower contact surfaces are configured to respectively contact lower and upper contact surfaces of the mating ferrule.

3. The optical ferrule of claim 1, wherein the offset of the lower contact surface below the mating plane is more than about 50 μm along the thickness axis.

4. The optical ferrule of claim 1, wherein the connecting surface is configured to slidably engage with a connecting surface of the mating optical ferrule.

5. The optical ferrule of claim 1, wherein the connecting surface comprises a ramp disposed at an angle with respect to the mating surface over a majority of a length of the connecting surface.

6. The optical ferrule of claim 1, wherein at least one of the upper stop surface and the lower stop surface is disposed at a non-perpendicular angle with respect to the mating plane.

7. The optical ferrule of claim 1, wherein, after mating with the mating optical ferrule the stop surfaces make contact with corresponding stop surfaces of the mating optical ferrule.

8. The optical ferrule of claim 7, wherein a bend in the optical waveguides provides a spring force that holds the stop surfaces of the optical ferrule in contact with the corresponding stop surfaces of the mating optical ferrule.

9. The optical ferrule of claim 1, wherein the connecting surface has a length that is greater than a sum of the offset below the mating plane of the lower contact surface and the offset above the mating plane of the upper contact surface.

10. An optical ferrule, comprising:
a first surface comprising:
one or more substantially parallel grooves oriented for receiving one or more optical waveguides, and;
a plurality of light redirecting members configured to be optically coupled to the optical waveguides;
an opposing second surface comprising a mating surface that defines a mating plane, the mating surface including an optically transmitting window for propagating an optical signal therethrough to an optically transmitting window of a mating optical ferrule; and
first and second compound stop features respectively disposed at opposing sides of the optical ferrule, each compound stop feature comprising:
an upper stop surface;
a lower stop surface, the lower stop surface offset from the upper stop surface along a mating axis of the optical ferrule and along an a thickness axis perpendicular to the mating surface; and
a ramp surface connecting the upper stop surface and the lower stop surface, the ramp surface inclined at an angle with respect to the mating surface over a majority of a length of the ramp surface.

11. The optical ferrule of claim 10, wherein the mating surface comprises:
a main portion that is parallel to the mating plane; and
one or more pads extending from the main portion, and wherein the pads are configured to rest on corresponding pads of the mating optical ferrule after mating.

12. The optical ferrule of claim 10, wherein the angle is sufficiently small to allow the ramp surface to slidably engage with a ramp surface of the mating connector during mating.

13. The optical ferrule of claim 10, wherein one or both of the first and second stop surfaces are substantially perpendicular to the mating plane.

14. The optical ferrule of claim 10, wherein at least one of the upper stop surface and the lower stop surface is disposed at a non-perpendicular angle with respect to the mating surface.

15. The optical ferrule of claim 10, wherein the ramp surface has a length that is greater than about 20% of a length of the optical ferrule.

16. An optical ferrule, comprising:
a first surface comprising:
one or more substantially parallel grooves oriented for receiving one or more optical waveguides, and;
a plurality of light redirecting members configured to be optically coupled to the optical waveguides;
an opposing second surface comprising a mating surface that defines a mating plane, the mating surface including an optically transmitting window for propagating an optical signal therethrough to an optically transmitting window of a mating optical ferrule; and
first and second compound stop features respectively disposed at opposing sides of the optical ferrule, each compound stop feature comprising:
an upper stop surface;
a lower stop surface, the lower stop surface offset from the upper stop surface along a mating axis of the optical ferrule and along a thickness axis perpendicular to the mating surface; and
a connecting surface connecting the lower stop surface and the upper stop surface, wherein a slope of the connecting surface relative to the mating axis is greater than zero over a majority of a length of the connecting surface.

17. The optical ferrule of claim 16, wherein the connecting surface has a substantially constant non-zero slope over the majority of the length of the connecting surface.

18. The optical ferrule of claim 16, wherein, after mating with the mating optical ferrule a bend in the optical waveguides of the optical ferrule provides a spring force that holds the stop surfaces of the optical ferrule in contact with the corresponding stop surfaces of the mating optical ferrule.

19. The optical ferrule of claim 16, wherein the upper stop surface is offset from the lower stop surface along the mating axis by about 50 to about 500 μm.

20. The optical ferrule of claim 16, wherein the mating surface comprises:
a main portion that is substantially parallel to the mating plane; and
one or more pads extending from the main portion of the mating surface.

* * * * *

UNITED STATES PATENT AND TRADEMARK OFFICE
CERTIFICATE OF CORRECTION

| | | |
|---|---|---|
| PATENT NO. | : 11,693,193 B2 | Page 1 of 1 |
| APPLICATION NO. | : 17/250100 | |
| DATED | : July 4, 2023 | |
| INVENTOR(S) | : Michael A Haase et al. | |

It is certified that error appears in the above-identified patent and that said Letters Patent is hereby corrected as shown below:

In the Claims

Column 10
Line 52, In Claim 10, delete "along an a thickness axis" and insert -- along a thickness axis --, therefor.

Signed and Sealed this
Ninth Day of January, 2024

Katherine Kelly Vidal
*Director of the United States Patent and Trademark Office*